ate of Patent: Dec. 16, 1986

United States Patent [19]
Korth

[11] Patent Number: 4,629,078
[45] Date of Patent: Dec. 16, 1986

[54] CLOTHES DISPLAY RACK
[75] Inventor: Bernd Korth, Weil am Rhein, Fed. Rep. of Germany
[73] Assignee: Protoned B.V., Amsterdam, Netherlands
[21] Appl. No.: 421,015
[22] Filed: Sep. 21, 1982
[30] Foreign Application Priority Data
Oct. 30, 1981 [CH] Switzerland ............ 6961/81
[51] Int. Cl.⁴ .............................................. A47B 47/00
[52] U.S. Cl. .................... 211/207; 211/205; 403/372; 248/414
[58] Field of Search ............... 211/196, 197, 205, 207; 403/372, 225, 226; 40/607; 248/414, 412
[56] References Cited

U.S. PATENT DOCUMENTS

| Re. 26,779 | 2/1970 | Weichenrieder | 40/607 X |
| 2,238,435 | 4/1941 | Perry | 403/225 |
| 2,656,605 | 10/1953 | Schlieder | 403/225 X |
| 3,201,895 | 8/1965 | Stivers | 403/225 X |
| 3,507,525 | 4/1970 | Sable | 403/372 |
| 4,411,470 | 10/1983 | Nishimura et al. | 248/412 |

FOREIGN PATENT DOCUMENTS

| 1432449 | 2/1966 | France | 403/225 |
| 257834 | 9/1926 | United Kingdom | 403/372 |

Primary Examiner—Ramon S. Britts
Assistant Examiner—Blair M. Johnson
Attorney, Agent, or Firm—Ladas & Parry

[57] ABSTRACT

A support part (1) of the clothes display rack is provided with a securing device (2) for a height-adjustable carrier-rod (3) for placard-holding means (4). The securing device (2) contains a plug part (6), which is inserted, with a tight fit, in the support part (1) and has a central bore (5) for the carrier-rod (3). Although this rod is securely held, by a clamping action, in a clamping zone (6', 6'') which is integrally connected to the plug part (6), it can nevertheless be shifted into virtually any desired axial position by applying a reasonable shifting force.

6 Claims, 4 Drawing Figures

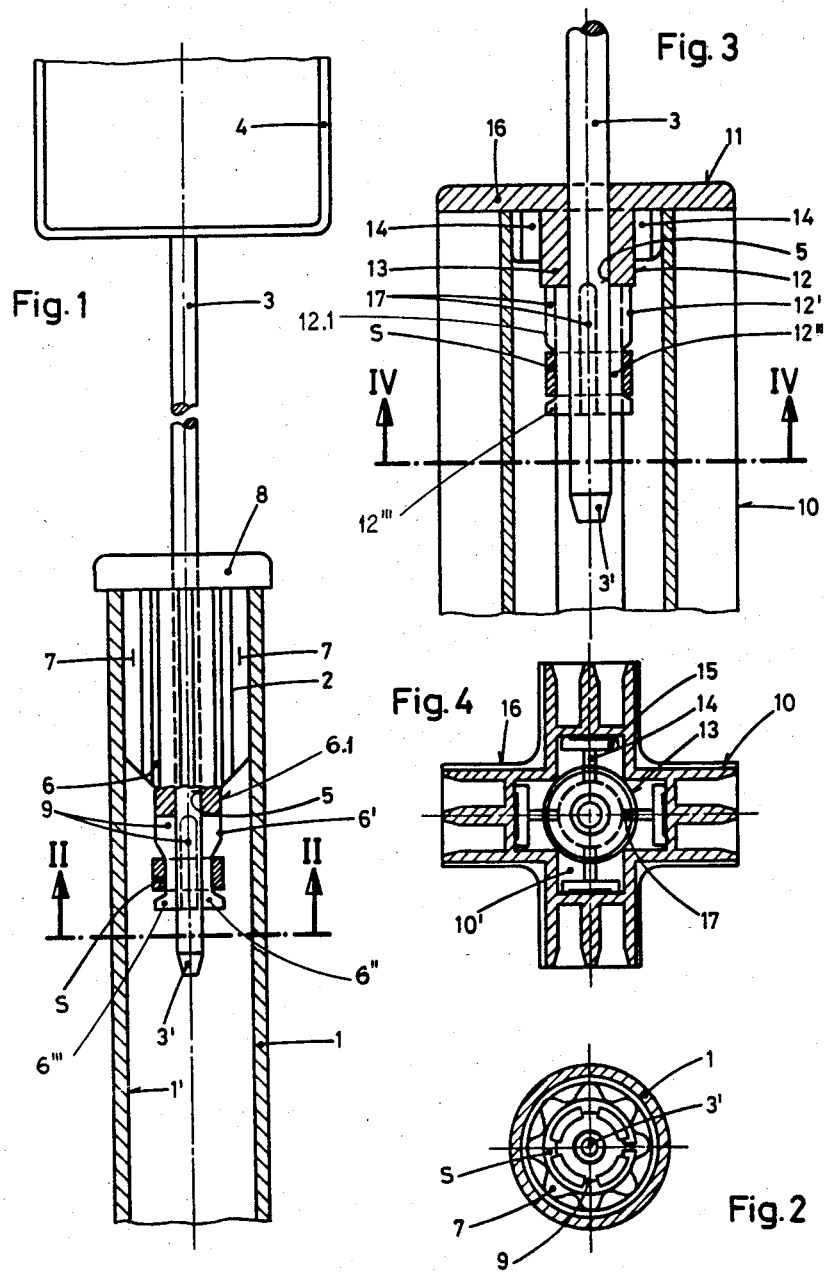

CLOTHES DISPLAY RACK

The present invention relates to a clothes display rack according to the pre-characterising clause of Patent claim 1.

Clothes display racks, which are set up in sales areas, are in many cases provided with devices for attaching or holding inscriptions relating to prices and/or sizes, or placards fulfilling similar functions. To enable the inscriptions or placards to be read from virtually any position around the display rack, the holding devices are preferably secured to rods, or to other means for carrying them, whereby the surfaces on which the information is presented are brought to a height at which they are visible without obstruction. The carrier-rods and similar components are usually secured to rack-columns, projecting members, or cross-members, by means of clamping devices and screw devices, and frequently form a more or less matched accessory part to the clothes display rack to which they are fitted. There is consequently a significant risk that bruises and scratches, peeled-off paint, or the peeling-off of other protective coatings, will occur on the rack and/or on the carrier-rods. There is the further risk that the comparatively thin and, at the same time, mechanically weak placard-rods will be bent, especially during the dismantling of the racks, which are often capable of easy assembly and dismantling, and will thus become unfit for further use.

The object of the invention consequently comprises the provision of a clothes display rack with a receiving device for a placard carrier-rod, this device being permanently present on the rack and in which device the carrier-rod is securely held, by a clamping action, in a manner permitting height-adjustment.

The solution which, according to the invention, achieves this object is defined by Patent claim 1. Embodiments of this solution are evident from the dependent claims 2 to 6.

The advantage of the proposed solution, according to the invention, resides in the fact that the placard carrier-rod can be secured to the rack without operating screw elements and clamping elements, it can easily be brought to any desired height-position on the rack, it can be removed, during dismantling of the rack, from the relevant part of the rack, without tools, and the danger of any damage to the surface is virtually excluded.

In the text which follows, the invention is described, by way of example, by reference to the drawing, in which:

FIG. 1 shows, in vertical section, how a placard carrier-rod is secured in the interior of a tubular rack support column, FIG. 2 shows a view of the securing device, in the viewing direction II—II in FIG. 1, FIG. 3 shows, in vertical section, a carrier-rod securing device in the interior of a cruciform support column, and FIG. 4 shows a view of the securing device, in the viewing direction IV—IV in FIG. 3.

The embodiment according to FIGS. 1 and 2 shows a column 1, made of circular-section tubing, of a clothes display rack, a placard carrier-rod securing device 2 being inserted, with a tight fit, into the upper end of this column. The placard carrier-rod 3, which, for example, possesses a placard-holding frame 4 at its upper end, seats centrally in the receiving bore 5 of the device 2 for securing the carrier-rod. The lower end 3' of the carrier-rod is shaped, for example by providing it with a rounded-off conically tapered terminal portion, in such a manner that the rod 3 can be introduced, without centering difficulties, into the receiving bore 5 in the securing device 2.

The carrier-rod securing device 2 has an upper portion of the plug 6, which is provided, over a portion of its length, with guiding and clamping ribs 7, fitting tightly against the wall of the receiving opening 1' in column 1, and centering the securing device 2 in the column 1, which is made of circular-section tubing. An outer end of the upper portion of the plug 6 can be provided with a column-cover cap 8, which can be moulded as a decorative column end-fitting. A lower portion of the plug 6.1 is tapered in two steps. The upper step 6' has a diameter which is somewhat smaller than the diameter of the main part of the upper portion of the plug 6. The upper step 6' has a sufficient flexibility which is necessary for clamping over the carrier rod 3. The lower step 6" has a crossection smaller than the diameter of the upper step 6'. The lower portion 6.1 of the plug has an enlargement 6''' to secure a clamping ring S from falling from the plug. The lower portion of the plug 6.1 is provided with longitudinal slots 9, passing through radially, extending over a significant proportion of its length, and defining a flexible clamping region for securely holding the placard carrier-rod 3 to the carrier-rod securing device 2, in a spring-like resilient manner. The clamping ring S is used to maintain a constant clamping action between the carrier rod securing device 2 and the carrier rod 3.

The guiding and clamping region and the column-cover cap 8 of the carrier-rod securing device 2 are manufactured, in one piece, from a plastic which is both tough and resilient, or from an appropriately flexible impact-resistant plastic, and the clamping ring S is preferably composed of steel or bronze.

FIGS. 3 and 4 show the configuration of a carrier-rod securing device 11, when used with a typical cruciform support column 10. The placard carrier-rod and its receiving bore in the securing device 11 are marked with the same reference numbers, 3 and 5, as in the first illustrative embodiment.

The upper plug portion 12 of the securing device 11, which part is again elongate in shape, possesses, in its uppermost (guiding) portion a section 13, which is at least approximately cylindrical and which has a diameter which is expediently aligned to the diagonal distance between the inward-projecting corner-edges inside the cavity 10' of the cruciform column-profile, so that the section 13 fits tightly against these edges. These corner-edges can thereby be employed as an aid for centering the securing device. Radially projecting T-shaped vane-like centering elements 14 are attached to the cylindrical section 13, which is located at the top, the centering beams 15 of these centering elements, which beams are located radially outermost, being matched to the width between the cross-limbs and forming at least one means of preventing the securing device from twisting relative to the support column 10. The upper plug portion 12 can, as already explained above, be provided with a column-cover cap 16, the vane-like centering elements 14 being joined to its undersurface.

A lower portion of the plug 12.1 is tapered in two steps. The upper step 12' has a diameter which is somewhat smaller then the diameter of the main part of the upper portion of the plug 12. The lower step 12" has a crossection smaller than the diameter of the upper step 12'. The lower portion of plug 12.1 has an enlargement 12''' to secure the clamping ring S from falling from the plug.

The lower portion of the plug is, furthermore, provided with longitudinal slots 17, passing through radially, extending virtually over its entire length, and defining a flexible clamping region for securely holding the placard carrier-rod 3 to the carrier-rod securing device 12, in a spring-like resilient manner.

I claim:

1. A clothes display rack comprising a height-adjustable carrier rod adapted for receiving placard-holding means on an upright support of the display rack and a device for securing the height-adjustable carrier rod, the device comprising, an elongated plug part having a substantially cylindrical upper portion and a lower end portion, said upper portion being adapted to be inserted tightly into a longitudinally directed central opening of the vertical support, said plug part having a central receiving bore for receiving said carrier rod and being provided with longitudinal clamping ribs on the surface thereof, the lower end portion of said plug part having a reduced diameter clamping zone in which said carrier rod is retainable in sliding engagement within said plug part.

2. A clothes display rack according to claim 1, wherein said clamping zone is provided with a plurality of radial longitudinal slots extending over its entire length and annular segments interposed therebetween, and in that said annular segments are interconnected through a clamping ring, which increases the pressure force onto the surface of said carrier rod.

3. A clothes display rack according to claim 1, wherein a column-cover cap is molded in one piece onto the upper end of said plug part.

4. A clothes display rack according to claim 1 wherein the clamping zone is provided with a plurality of radial slots passing through and extending over its entire length and annular segments being interposed therebetween to produce engagement of said annular segments in the manner of a split chuck on the surface of the carrier rod and a clamping ring being placed over the annular segments to increase a pressure-contact force.

5. A clothes display rack according to claim 1 wherein a free end of the carrier rod has a tapered configuration.

6. A clothes display rack according to the claim 1 wherein a free end of the carrier rod has a rounded off configuration.

* * * * *